(12) United States Patent
Nishimura et al.

(10) Patent No.: US 8,758,893 B2
(45) Date of Patent: *Jun. 24, 2014

(54) ENAMELWARE AND GLAZE

(75) Inventors: Satoshi Nishimura, Kitakyushu (JP);
Shunji Sakamoto, Kitakyushu (JP);
Hidekuni Murakami, Kitakyushu (JP)

(73) Assignee: Nippon Steel & Sumitomo Metal Corporation, Tokyo (JP)

(*) Notice: Subject to any disclaimer, the term of this patent is extended or adjusted under 35 U.S.C. 154(b) by 1153 days.

This patent is subject to a terminal disclaimer.

(21) Appl. No.: 12/087,801

(22) PCT Filed: Jan. 12, 2007

(86) PCT No.: PCT/JP2007/050739
§ 371 (c)(1),
(2), (4) Date: Jul. 14, 2008

(87) PCT Pub. No.: WO2007/083722
PCT Pub. Date: Jul. 26, 2007

(65) Prior Publication Data
US 2008/0318029 A1 Dec. 25, 2008

(30) Foreign Application Priority Data

Jan. 18, 2006 (JP) .................. 2006-009975
Jul. 14, 2006 (JP) .................. 2006-194820

(51) Int. Cl.
*B32B 15/04* (2006.01)
*B32B 15/18* (2006.01)

(52) U.S. Cl.
USPC ........... 428/332; 428/457; 428/615; 428/681; 428/684; 420/87; 420/89; 420/92; 420/93

(58) Field of Classification Search
None
See application file for complete search history.

(56) References Cited

U.S. PATENT DOCUMENTS

| | | | |
|---|---|---|---|
| 5,152,846 A | 10/1992 | Osawa et al. | |
| 5,853,659 A * | 12/1998 | Sekita et al. | 420/92 |
| 5,993,974 A | 11/1999 | Fukushima et al. | |
| 6,177,201 B1 | 1/2001 | Wallace et al. | |
| 6,676,774 B2 * | 1/2004 | Matsuoka et al. | 148/328 |

FOREIGN PATENT DOCUMENTS

| | | |
|---|---|---|
| JP | 51-98715 | 8/1976 |
| JP | 61-122136 | 6/1986 |
| JP | 4-99844 | 3/1992 |
| JP | 5-140770 | 6/1993 |
| JP | 05331593 A * | 12/1993 |
| JP | 6-322445 | 11/1994 |
| JP | 7-41864 | 2/1995 |
| JP | 7-150252 | 6/1995 |
| JP | 10-8137 | 1/1998 |
| JP | 10-183300 | 7/1998 |
| JP | 2001011573 A * | 1/2001 |
| JP | 2002-080934 | 3/2002 |
| JP | 2004-225150 | 10/2004 |
| JP | 3643319 | 4/2005 |
| JP | 3699669 | 9/2005 |
| JP | 2005-344141 | 12/2005 |
| JP | 2005330510 A * | 12/2005 |
| JP | 2006-45580 | 2/2006 |

OTHER PUBLICATIONS

Taiwanese Office Action in related Taiwanese Application 096101596 dated Sep. 14, 1999.
International Search Report dated Apr. 17, 2007 issued in corresponding PCT Application No. PCT/JP2007/050739.
Chinese Office Action dated May 12, 2010.
Studies in Enamel, Feb. 1983 (with concise English explanation).

* cited by examiner

*Primary Examiner* — Monique Jackson
(74) *Attorney, Agent, or Firm* — Kenyon & Kenyon LLP

(57) ABSTRACT

The present invention provides enamelware and a glaze improving the bondability between the steel substrate and enamel layer and superior in resistance to dew point corrosion by sulfuric acid and hydrochloric acid, that is, a steel substrate of a composition containing, by mass %, Cu: 0.05 to 0.5%, Si: 0.1 to 2.0%, Mn: 0.05 to 2.0%, P: 0.005 to 0.10%, and S: 0.005 to 0.1%, restricting C to C: 0.20% or less, and comprising a balance of Fe and unavoidable impurities on the surface of which an enamel layer of a thickness of 50 to 700 μm is provided. At that time, the content of Co oxides in the enamel layer is made, converted to Co, 0.01 to 10% and/or the content of Ni oxides is made, converted to Ni, 0.05 to 20% or the total content of Ni in the steel substrate and enamel layer is made 0.005 to 4.5% with respect to the total mass of the enamelware and/or the total content of Co is made 0.008 to 4.0% with respect to the total mass of the enamelware.

4 Claims, No Drawings

ENAMELWARE AND GLAZE

TECHNICAL FIELD

The present invention relates to enamelware comprised of a steel material forming a substrate on the surface of which a glass-like enamel layer is provided and a glaze used when producing this enamelware, more particularly relates to enamelware and glaze used for an air preheater element or casing member of a power plant, a casing member or duct of a civilian use boiler or garbage incinerator, etc.

BACKGROUND ART

Enamelware is comprised of a steel material, cast iron, aluminum, copper material, stainless steel, or other metal material forming a substrate on the surface of which a glass-like enamel layer is formed. It is produced for example by forming the metal substrate into a predetermined shape, then applying a glaze (frit) to the surface and firing at a high temperature. This enamelware is resistant to surface flaws, enables oily dirt etc. to be easily removed, and is superior in heat resistance, acid resistance, and alkali resistance, so is being used for kitchen products, diningware, sanitary vessels, interior and exterior materials of buildings, and other broad applications.

Further, in air preheater elements or casing members of power plants, casing members or ducts of civilian use boilers or garbage incinerators, and other applications as well, in addition to the conventionally used sulfuric-acid and hydrochloric-acid dew-point corrosion-resistant steel materials and weather-resistant steel materials and other corrosion resistance steel materials (for example, see Japanese Patent No. 3699669), an enameled steel material comprised of a substrate formed by a steel material on the surface of which an enamel layer is provided is being used. In general, the steel material used as a substrate for an enameled steel material is equivalent to ordinary steel in corrosion resistance. To use enamelware comprised of enameled steel materials for these applications, the bondability between the substrate and enamel layer, fishscale resistance, resistance to bubbles and black spot flaws, and other enameling characteristics and workability have to be excellent.

As art for improving the enameling characteristics, in the past the method has been proposed of making the arithmetic surface roughness (Ra) of the surface of the steel sheet forming the substrate 0.5 to 5 μm and making the mean space (Sm) of surface relief 30 to 300 μm so as to improve the bondability with an enamel layer (for example, see Japanese Patent Publication (A) No. 2005-344141). Further, in the past, an enameling use steel sheet improving both the enameling characteristics and workability by setting suitable steel ingredients (for example, see Japanese Patent Publication (A) No. 2002-80934 and Japanese Patent No. 3643319). For example, the enameling use steel sheet as described in Japanese Patent Publication (A) No. 2002-80934 reduces the C content to a specific amount or less, sets suitable contents of Si, Mn, P, S, Al, N, B, and O, and further sets (N present as BN)/(N present as AlN) to 10.0 or more. Further, Japanese Patent No. 3643319 discloses an enameling use steel sheet having a deep drawability equal to or better than Ti-containing steel by reducing the C content to a specific amount or less, setting suitable contents of Mn, Si, Al, N, O, P, S, and Cu, and further adding suitable quantities of Nb and V.

DISCLOSURE OF THE INVENTION

However, in recent years, in power plants etc., the operating temperature has been lowered for environmental concerns and for improving the operating efficiency. Further, due to the soaring cost of fuel resources, lower priced coal and heavy oil and other high sulfur-content fuels are tending to increasingly be used. Members made of the conventionally used corrosion resistant steel materials and enameled steel materials have insufficient corrosion resistance in such usage environments. There was therefore the problem of an increase in the frequency of maintenance and greatly increased operating costs.

For example, as explained above, the enameled steel materials described in Japanese Patent Publication (A) No. 2005-344141, Japanese Patent Publication (A) No. 2002-80934, and Japanese Patent No. 3643319 have corrosion resistances of the steel materials used as the substrates equal to that of ordinary steel. Further, the enamel layers are generally susceptible to soot blow mechanical wear or other mechanical damage. For this reason, conventional enameled steel material is superior in corrosion resistance in the state provided with the enamel layer, but when the enamel layer is chipped, has a low corrosion resistance in the same way as ordinary steel and has a remarkably fast progression of corrosion. Further, to give a corrosion resistant steel material not treated on the surface such as described in Patent Document 1 enough of a corrosion resistance to withstand operation using high sulfur-content fuel at a low temperature, the production costs are increased about 10- to 15-fold. This is not practical.

The present invention was made in consideration of the above problems and has as its object to provide enamelware and glaze which improves the bondability between the steel substrate and enamel layer and is excellent in resistance to dew point corrosion by sulfuric acid and hydrochloric acid.

The enamelware according to the present invention is enamelware comprised of a steel substrate on the surface of which an enamel layer is provided, wherein the steel substrate contains, by mass %, Cu: 0.05 to 0.5%, Si: 0.1 to 2.0%, Mn: 0.05 to 2.0%, P: 0.005 to 0.10%, and S: 0.005 to 0.1%, restricts C to C, 0.20% or less, and comprises a balance of Fe and unavoidable impurities, and the enamel layer contains, by mass %, at least one element selected from the group comprised of Co: 0.01 to 10% and Ni: 0.05 to 20% and has a thickness of 50 to 700 μm.

In the present invention, since the composition of the steel substrate is suitably set, the steel substrate becomes superior to the conventional enameled steel material in corrosion resistance. Further, the content of the Co contained as Co oxides in the enamel layer and/or the content of Ni contained as Ni oxides are suitably set, so the bondability between the steel substrate and enamel layer is high. For this reason, compared with conventional enamelware, it is possible to improve the resistance to sulfuric acid and the acid dew point corrosion resistance.

Another enamelware according to the present invention is enamelware comprised of a steel substrate on the surface of which an enamel layer is provided, wherein the steel substrate contains, by mass %, Cu: 0.05 to 0.5%, Si: 0.1 to 2.0%, Mn: 0.05 to 2.0%, P: 0.005 to 0.10%, and S: 0.005 to 0.1%, restricts C to C, 0.20% or less, and comprises a balance of Fe and unavoidable impurities, the enamel layer has a thickness of 50 to 700 μm, and the steel substrate and the enamel layer contain at least one element selected from the group comprising, in total content per total mass, Ni: 0.005 to 4.5% and Co: 0.008 to 4.0%.

In the present invention, since the composition of the steel substrate is suitably set, the steel substrate is superior in corrosion resistance to a conventional enameled steel material. Further, since the total content of Co contained in the steel substrate and enamel layer and/or the total content of Ni are suitably set, the bondability between the steel substrate and enamel layer is high. For this reason, compared with the conventional enamelware, it is possible to improve the sulfuric acid resistance and acid dew point corrosion resistance.

In these enamelware, the steel substrate may further have added to it, by mass %, one or more elements selected from the group comprised of Sb: 0.005 to 0.8%, Sn: 0.005 to 0.3%, and Cr: 0.005 to 2.0%.

Further, the steel substrate may contain, by mass %, one or more elements selected from the group comprised of Mo: 0.003 to 1.0%, Co: 0.01 to 2%, and Ni: 0.005 to 2.0%. Due to this, it is possible to improve the corrosion resistance of the steel substrate.

In these enamelware, the steel substrate may further contain, by mass %, one or more elements selected from the group comprised of Sb: 0.005 to 0.8%, Sn: 0.005 to 0.3%, and Cr: 0.005 to 2.0%.

Further, the steel substrate may further contain, by mass %, one or more elements selected from the group comprised of Mo: 0.003 to 1.0%, Co: 0.01 to 2%, and Ni: 0.005 to 2.0%. Due to this, the steel substrate can be improved in corrosion resistance.

Further, the steel substrate may further contain, by mass %, one or more elements selected from the group comprised of Ti: 0.01 to 2.0%, Nb: 0.01 to 2.0%, V: 0.01 to 2.0%, Zr: 0.01 to 2.0%, and B: 0.001 to 1.0%. Due to this, the steel substrate can be improved in workability and aging resistance.

Still further, the steel substrate may further contain, by mass %, one or more elements selected from the group comprised of Ca: 0.005 to 2.0%, Rem: 0.005 to 2.0%, and Mg: 0.005 to 1.0%.

Still further, the steel substrate may further contain, by mass %, O: 0.01 to 0.30%. Due to this, the fishscale resistance can be improved and the drop in the workability of the steel substrate can be kept to a minimum.

Still further, the steel substrate may further contain, by mass %, Al: 0.005 to 0.10%. Due to this, the fishscale resistance can be improved.

On the other hand, in these enamelware, the steel substrate and the enamel layer may have a plating layer comprised of Ni, an Ni alloy, Co, a Co alloy, Zn, a Zn alloy, Al, an Al alloy, Sn, or a Sn alloy having a thickness of 1 to 500 µm provided between them. By providing a plating layer between the steel substrate and the enamel layer in this way, the bondability between the steel substrate and the enamel layer can be improved.

The glaze according to the present invention is glaze used when producing the above enamelware and is characterized by containing, by mass %, at least one element selected from the group comprised of Co: 0.01 to 10% and Ni: 0.05 to 20%.

In the present invention, the Co content and/or Ni content in the glaze is suitably set, so the steel substrate can be formed with a high bondability enamel layer. Therefore, enamelware superior in sulfuric acid resistance and acid dew point corrosion resistance compared with a conventional enamelware can be obtained.

BEST MODE FOR CARRYING OUT THE INVENTION

Below, the best mode for carrying out the present invention will be explained in detail. Note that in the following explanation, the mass % in the compositions of the substrate and enamel layer indicates just "%".

The inventors discovered that by suitably setting the composition of the steel material forming the substrate and the enameling treatment applied to its surface, it is possible to achieve the above object and thereby reached the present invention. That is, the enamelware according to a first embodiment of the present invention comprises a steel substrate of a composition containing Cu: 0.05 to 0.5%, Si: 0.1 to 2.0%, Mn: 0.05 to 2.0%, P: 0.005 to 0.10%, and S: 0.005 to 0.1%, restricting the C to C, 0.20% or less, and comprised of a balance of Fe and unavoidable impurities on the surface of which an enamel layer containing Co oxides, converted to Co, in an amount of 0.01 to 10% and/or Ni oxides, converted to Ni, in an amount of 0.05 to 20%, and having a thickness of 50 to 700 µm.

First, the reasons for addition of the steel ingredients forming the substrate and the reasons for the numerical limitations will be explained.

Cu: 0.05 to 0.5%

Cu has the effect of improving the bondability between the steel substrate and enamel layer. Further, Cu also has the effect of improving the corrosion resistance. By adding the Cu, even if the enamel layer is chipped, superior corrosion resistance can be maintained and the progression of corrosion can be inhibited. However, when the Cu content is less than 0.05%, the above effect cannot be obtained. On the other hand, even if adding Cu over 0.5%, the effect becomes saturated and no improvement in bondability and corrosion resistance can be seen. Therefore, the Cu content is made 0.05 to 0.5%.

Si: 0.1 to 2.0%

Si is an element effective for improvement of the corrosion resistance of the steel substrate. However, if the Si content is less than 0.1%, that effect cannot be obtained. On the other hand, if the Si content is over 2.0%, not only does the effect of improvement of the corrosion resistance become saturated, but also the bondability between the steel substrate and enamel layer is lowered. Accordingly, the Si content is made 0.1 to 2.0%.

Mn: 0.05 to 2.0%

Mn has the effect of suppressing the formation of fishscale and other flaws in the enamel layer. Further, Mn is an ingredient having an effect on the enamel characteristics and has the effect of prevention of hot embrittlement due to S at the time of hot rolling. However, when the Mn content is 0.05%, these effects cannot be obtained. On the other hand, if the Mn content exceeds 2.0%, the effect of suppression of formation of flaws becomes saturated. Further, excessive addition of Mn invites an increase in the production costs. Therefore, the Mn content is made 0.05 to 2.0%.

P: 0.005 to 0.10%

P is an element effective for improvement of the workability. However, if the P content is less than 0.005%, the crystal grains become coarser and the aging becomes greater. On the other hand, if the P content exceeds 0.10%, the steel substrate hardens, the workability drops, and smut causing bubbles and black spot flaws increases. Further, excessive addition of P invites an increase in the production costs. Therefore, the P content is made 0.005 to 0.10%.

S: 0.005 to 0.1%

S is an element effective for improving the fishscale resistance by the composite addition with Mn. However, if the S content is less than 0.005%, the effect cannot be obtained. On the other hand, if the S content exceeds 0.1%, not only is the effect of improvement of the fishscale resistance saturated, but also the amount of smut increases and bubbles and black spot flaws easily occur. Therefore, the S content is made 0.005 to 0.1%.

C: 0.20% or less

The lower the C content, the better the workability. Specifically, if the C content exceeds 0.20%, a good workability cannot be obtained and further the aging resistance and enameling characteristics also drop. Therefore, the C content is restricted to 0.20% or less. Note that, the C content is preferably as small as possible. The lower limit does not have to be particularly set, but if the C content is reduced, the steelmaking costs increase, so in practice 0.0005% is preferably made the lower limit.

Further, the steel substrate in the enamelware of the present invention may further have added to it, in addition to the above ingredients, one or more elements selected from the group comprised of Sb: 0.005 to 0.8%, Sn: 0.005 to 0.3%, and Cr: 0.005 to 2.0%.

Sb: 0.005 to 0.8%

Sb has the effect of further improving the corrosion resistance of the steel substrate. However, if the Sb content is less than 0.005%, that effect cannot be obtained, while if the Sb content is over 0.8%, the effect of improvement of the corrosion resistance becomes saturated. Accordingly, when adding Sb, the content is made 0.005 to 0.8%.

Sn: 0.005 to 0.3%

Sn is an element effective for improvement of the corrosion resistance of the steel substrate. However, if the Sn content is less than 0.005%, that effect cannot be obtained. On the other hand, if the Sn content is over 0.3%, the effect of improvement of the corrosion resistance becomes saturated. Therefore, when adding Sn, the content is made 0.005 to 0.3%.

Cr: 0.005 to 2.0%

Cr has the effect of further improving the corrosion resistance for use under a wet environment. However, if the Cr content is less than 0.005%, that effect cannot be obtained, while if the Cr content is over 2.0%, the effect of improvement of the corrosion resistance becomes saturated. Therefore, when adding Cr, the content becomes 0.005 to 2.0%.

Further, the steel substrate of the enamelware of the present embodiment may further have added to it, in addition to the above ingredients, one or more elements selected from the group comprised of Mo: 0.003 to 1.0%, Co: 0.01 to 2%, and Ni: 0.005 to 2.0%.

Mo: 0.003 to 1.0%

Mo is an element effective for improving the hydrochloric acid corrosion resistance and bondability with an enamel layer. However, if the Mo content is less than 0.003%, that effect cannot be obtained, while if the Mo content is over 1.0%, the effect of improvement of the hydrochloric acid corrosion resistance becomes saturated. Further, excessive addition of Mo invites an increase in the production costs. Accordingly, when adding Mo, the content is made to become 0.003 to 1.0%.

Co: 0.01 to 2.0%

Co is an element having the effect of further improving the corrosion resistance for use under a wet environment and has the effect of improving the bondability with an enamel layer. However, if the Co content is less than 0.01%, the effect of improvement of the bondability with the enamel layer cannot be obtained. On the other hand, if the Co content exceeds 2.0%, the effect becomes saturated. Therefore, when adding Co, the content is made to become 0.01 to 2.0%.

Ni: 0.005 to 2.0%

Ni is an element effective as a measure against embrittlement due to Cu in various production processes such as the continuous casting process and hot rolling process when Cu is added. Further, it has the effect of further improving the corrosion resistance for use under a wet environment and the effect of improving the bondability with the enamel layer. However, when the Ni content is less than 0.005%, the effect of improvement of the bondability with an enamel layer cannot be obtained. Further, if the Ni content exceeds 2.0%, the effects of the measures against embrittlement and improvement of the corrosion resistance become saturated. Therefore, when adding Ni, the content is made 0.005 to 2.0%.

Still further, the steel substrate of the enamelware of the present embodiment may have added to it, in addition to the above ingredients, one or more elements selected from the group comprised of Ti: 0.01 to 2.0%, Nb: 0.01 to 2.0%, V: 0.01 to 2.0%, Zr: 0.01 to 2.0%, and B: 0.001 to 1.0%.

Ti: 0.01 to 2.0%

Ti is a carbide forming element and has the effect of immobilizing the C and N in the steel and improving the workability and aging characteristic. However, if the Ti content is less than 0.01%, that effect cannot be obtained. On the other hand, if excessively adding Ti, the steelmaking costs are increased, so in practice it is preferable to make 2.0% the upper limit. Therefore, when adding Ti, the content is made 0.01 to 2.0%.

Nb: 0.01 to 2.0%

Nb, like Ti, has the effect of immobilizing the C and N in the steel and improving the workability and aging characteristic without causing a drop in the bondability with the enamel layer. Further, Nb has the effect of improving the fishscale resistance. However, if the Nb content is less than 0.01%, these effects cannot be obtained. On the other hand, excessive addition of Nb invites an increase in the steelmaking costs, so in practice it is preferable to make 2.0% the upper limit. Therefore, when adding Nb, the content is made 0.01 to 2.0%.

V: 0.01 to 2.0%

V has the effect of immobilizing the N and improving the workability, aging resistance, and fishscale resistance, but when the V content is less than 0.01%, these effects cannot be obtained. On the other hand, to prevent an increase in steelmaking costs, it is preferable to make the upper limit of the amount of addition of V 2.0%. Therefore, when adding V, the content is made 0.01 to 2.0%.

Zr: 0.01 to 2.0%

Zr has the effect of keeping the deterioration of the bonding strength with the enamel layer to a minimum and of immobilizing the C and N in the steel to improve the workability and aging resistance. However, if the Zr content is less than 0.01%, these effects cannot be obtained. On the other hand, if the Zr content exceeds 2.0%, the steelmaking costs increase, so this is not practical. Accordingly, when adding Zr, the content is made 0.01 to 2.0%.

B: 0.001 to 1.0%

B has the effect of forming a nitride (BN) to immobilize the N and improve the resistance to secondary work cracking, so when the B content is less than 0.001%, that effect cannot be obtained. On the other hand, excessive addition of B invites an increase in the steelmaking costs, so in practice it is preferable to make 1.0% the upper limit. Accordingly, when adding B, the content is made 0.001 to 1.0%.

Still further, the steel substrate of the enamelware of the present invention may further contain, in addition to the above ingredients, one or more elements selected from the group comprised of Ca: 0.005 to 2.0%, Rem: 0.005 to 2.0%, and Mg: 0.005 to 1.0%.

Ca: 0.005 to 2.0%

Ca has the effect of eliminating flaws occurring at the time of the steelmaking and hot rolling. However, when the Ca content is less than 0.005%, this effect cannot be obtained. On the other hand, when the Ca content is over 2.0%, the steelmaking costs are increased, so this is not practical. Therefore, when adding Ca, the content is made 0.005 to 2.0%.

Rem: 0.005 to 2.0%

An Rem (rare earth element), like the above-mentioned Ca, is an element effective for eliminating flaws occurring at the time of steelmaking and hot rolling. However, if the Rem content is less than 0.005%, that effect cannot be obtained, while if the Rem content is over 2.0%, it invites an increase in the steelmaking costs, so is not practical. Therefore, when adding an Rem, the content is made 0.005 to 2.0%. Note that when adding a plurality of types of Rem's, the total content is made the above range.

Mg: 0.005 to 1.0%

Mg has the effect of increasing the fineness of inclusions produced in the steelmaking process. However, when the Mg content is less than 0.005%, that effect cannot be obtained. On the other hand, an increase in the steelmaking costs is invited, so in practice 1.0% is preferably made the upper limit. Accordingly, when adding Mg, the content is made 0.005 to 1.0%.

Still further, the steel substrate of the enamelware of this embodiment may further contain, in addition to the above ingredients, O: 0.01 to 0.30%. O has the effect of keeping the drop in the workability to a minimum and improving the fishscale resistance in the enameling performance. However, if the O content is less than 0.01%, that effect cannot be obtained, while if the 0 content is over 0.30%, the effect of improvement of the fishscale resistance becomes saturated. Accordingly, when adding O, the content is made 0.01 to 0.30%.

Still further, the steel substrate of the enamelware of the present embodiment may further have added to it, in addition to the above ingredients, Al: 0.005 to 0.10%. Al is an element effective for deoxidation, but when the Al content is less than 0.005%, the effect cannot be obtained. Further, when it is necessary to secure the above-mentioned range of O to improve the fishscale resistance, the upper limit of the Al content is preferably made 0.10%. Therefore, when adding Al, the content is made 0.005 to 0.10%.

Note that the ingredients other than the above ingredients of the steel substrate are Fe and unavoidable impurities. As the unavoidable impurities in the present invention, for example, Na, K, F, etc. may be mentioned.

Next, the reasons for the numerical limitations of the ingredients forming the enamel layer will be explained. The enamelware of the present embodiment contains at least one of Co oxides and Ni oxides in the enamel layer.

Co: 0.01 to 10%

A Co oxide has the effect of reducing the difference between the coefficient of expansion of the steel substrate and the coefficient of expansion of the enamel layer, suitably roughening the surface of the enamel layer, and improving the bondability with the steel substrate. However, when the content of Co due to the Co oxides in the enamel layer is less than 0.01%, the effect of improvement of the bondability cannot be obtained. Further, the upper limit of the Co content does not particularly have to be set, but from the viewpoint of the production costs, the Co content in the enamel layer is preferably made 10% or less. Therefore, when the enamel layer contains Co oxides, the Co content in the enamel layer is made 0.01 to 10%.

Ni: 0.05 to 20%

An Ni oxide, like the above-mentioned Co oxides, has the effect of reducing the difference between the coefficient of expansion of the steel substrate and the coefficient of expansion of the enamel layer, suitably roughening the surface of the enamel layer, and improving the bondability with the steel substrate and enamel layer. However, when the content of Ni due to the Ni oxides in the enamel layer is less than 0.05%, the effect of improvement of the bondability cannot be obtained. Further, when the Ni content exceeds 20%, an increase in the production costs is invited. Accordingly, when the enamel layer includes Ni oxides, the Ni content in the enamel layer is made 0.05 to 20%.

Further, the enamel layer of the enamelware of the present embodiment has a thickness of 50 to 700 μm. If the thickness of the enamel layer is less than 50 μm, the fine particles in the exhaust gas grind away the enamel layer and shorten the lifetime until it no longer functions as a protective layer. On the other hand, if the thickness of the enamel layer is over 700 μm, the enamel layer itself becomes brittle and easily peels off even with light impact during working.

Further, the enamelware of the present embodiment may be provided with a plating layer comprised of Ni, an Ni alloy, Co, a Co alloy, Zn, an Zn alloy, Al, an Al alloy, Sn, or an Sn alloy between the steel substrate and enamel layer. Due to this, it is possible to improve the bondability between the steel substrate and enamel layer. However, when the plating layer comprised of these metals has a thickness of less than 1 μm, a sufficient effect of improvement of the bondability cannot be obtained. Note that the upper limit of the thickness of the plating layer is not particularly set, but if considering the production costs, the plating layer is preferably made 500 μm or less. Therefore, when providing a plating layer comprised of the above metals between the steel substrate and enamel layer, the thickness is made 1 to 500 μm.

Next, enamelware according to a second embodiment of the present invention will be explained. The enamelware of the present embodiment is comprised of a steel substrate of a composition containing Cu: 0.05 to 0.5%, Si: 0.1 to 2.0%, Mn: 0.05 to 2.0%, P: 0.005 to 0.10%, and S: 0.005 to 0.1%, restricting C to C: 0.20% or less, and comprising a balance of Fe and unavoidable impurities on the surface of which an enamel layer of a thickness of 50 to 700 μm is provided, where the steel substrate and enamel layer contain, per total mass of the enamelware, Ni in a total content of 0.005 to 4.5% and/or Co in a total content of 0.008 to 4.0%.

As explained above, Ni and Co gave the effects of improving the bondability between the steel substrate and enamel layer even when added to either the steel substrate or the enamel layer. Further, when Ni and/or Co are present in both of the steel substrate and enamel layer, Ni and/or Co for mutual dispersion become unnecessary, so even if the contents in the steel substrate and/or enamel layer are small, the above effects are obtained. Specifically, if the total content of Ni in the steel substrate and enamel layer is 0.005% or more and the total content of Co in the steel substrate and enamel layer is 0.008% or more, the effect of improvement of the bondability is obtained. On the other hand, the upper limits of the total Co content and the total Ni content do not particularly have to be set, but from the viewpoint of the production costs, they are preferably made 4.0% or less of total Co content and 4.5% or less of total Ni content with respect to the total mass of the enamelware.

Note that the reasons for addition of the different steel ingredients in the steel substrate of the enamelware of the embodiments and the reasons for their numerical limitations are similar to the enamelware of the above-mentioned first embodiment.

Next, the method of production of the enamelware configured as explained above will be explained. The enamelware of the above-mentioned first and second embodiments can be produced by for example the following steps. First, a steel sheet of a composition containing Cu: 0.05 to 0.5%, Si: 0.1 to 2.0%, Mn: 0.05 to 2.0%, P: 0.005 to 0.10%, and S: 0.005 to 0.1%, restricting C to C: 0.20%, and comprising a balance of Fe and unavoidable impurities is formed into a predetermined shape to fabricate a steel substrate, then, in accordance with need, the surface of this steel substrate is degreased, pickled, and plated. Next, the surface of this steel substrate is, for example, coated with a glaze (underglaze) of a composition containing silicate, feldspar, sodium borate, soda ash, fluorite, sodium nitrate, cobalt oxide, nickel oxide, manganese dioxide, etc., dried, then fired to form an enamel layer. Further, in accordance with need, this enamel layer is, for example, coated with a glaze (overglaze) containing silicate, fluorite, sodium nitrate, titanium oxide, etc., dried, then fired. At this time, a glaze (frit) containing Co oxides in an amount, converted to Co, of 0.01 to 10% and/or Ni oxides in an amount, converted to Ni, of 0.05 to 20% is used to give a Co content in the enamel layer of 0.01 to 10% and an Ni content of 0.05 to 20% or a total content of Ni contained in the steel substrate and enamel layer of 0.005 to 4.5% and a total content of Co of 0.008 to 4.0%. Note that, the composition of the glaze (frit) may be suitably adjusted within the above-mentioned range in accordance with the composition of the steel substrate.

As explained above, in the enamelware of the first and second embodiments of the present invention, since the contents of Cu, Si, Mn, P, and S in the steel substrate are suitably set and the C content is reduced, the steel substrate can be improved in corrosion resistance without lowering the workability. Further, since the content of Co derived from the Co oxides in the enamel layer is made 0.01 to 10% and the content of Ni derived from the Ni oxides is made 0.05 to 20% or the total content of Ni contained in the steel substrate and enamel layer is 0.005 to 4.5% and the total content of Co is 0.008 to 4.0%, the bondability between the steel substrate and enamel layer can be improved. As a result, the steel substrate is improved in corrosion resistance and the bondability between the steel substrate and enamel layer is improved, so compared with conventional enamelware, the corrosion resistance with respect to sulfuric acid and hydrochloric acid can be improved.

EXAMPLES

Example 1

Below, examples of the present invention and comparative examples outside the range of the present invention will be given to explain the effects of the present invention more specifically. First, as Example 1 of the present invention, steels of the compositions shown in the following Table 1 were made in a vacuum melting furnace, cast into ingots, then hot rolled, cold rolled, and annealed to produce steel sheets (steel substrates) of a thickness of 1.0 mm. Further, the surfaces of the steel sheets were formed with enamel layers of thicknesses of 150 μm changed in Co content and Ni content to produce enamelware of the examples and comparative examples. Note that the balances of the steel compositions shown in the following Table 1 were comprised of Fe and unavoidable impurities. Further, in the following Table 1, conditions outside the range of the present invention are shown underlined.

TABLE 1

| Steel sheet no. | Steel composition (mass %) | | | | | | | | | | |
|---|---|---|---|---|---|---|---|---|---|---|---|
| | Cu | C | Si | Mn | P | S | Sb | Sn | Cr | Mo | Co |
| 1 | 0.35 | 0.005 | 0.25 | 0.88 | 0.025 | 0.018 | — | — | — | — | — |
| 2 | 0.36 | 0.100 | 0.80 | 0.88 | 0.025 | 0.018 | — | — | — | — | — |
| 3 | 0.33 | 0.001 | 0.20 | 0.88 | 0.003 | 0.018 | — | — | — | — | — |
| 4 | 0.37 | 0.150 | 0.30 | 0.50 | 0.025 | 0.018 | — | — | — | — | — |
| 5 | 0.38 | 0.080 | 0.22 | 0.55 | 0.015 | 0.018 | — | — | — | — | — |
| 6 | 0.35 | 0.003 | 0.25 | 0.88 | 0.025 | 0.018 | — | — | — | — | — |
| 7 | 0.36 | 0.100 | 0.80 | 1.00 | 0.020 | 0.050 | 0.075 | — | — | — | — |
| 8 | 0.37 | 0.070 | 0.50 | 0.87 | 0.018 | 0.025 | 0.080 | 0.065 | — | — | — |
| 9 | 0.33 | 0.003 | 0.75 | 0.65 | 0.026 | 0.035 | 0.010 | 0.150 | 1.00 | — | — |
| 10 | 0.35 | 0.100 | 0.35 | 0.70 | 0.028 | 0.033 | 0.050 | 0.130 | 0.05 | 0.023 | — |
| 11 | 0.36 | 0.050 | 0.45 | 0.65 | 0.033 | 0.023 | 0.050 | 0.240 | 0.50 | 0.024 | 0.06 |
| 12 | 0.37 | 0.003 | 0.30 | 0.75 | 0.025 | 0.036 | 0.060 | 0.200 | 0.60 | 0.020 | 0.06 |
| 13 | 0.37 | 0.003 | 0.30 | 0.75 | 0.025 | 0.036 | 0.060 | 0.200 | 0.60 | 0.020 | 0.05 |
| 14 | 0.36 | 0.100 | 0.35 | 0.60 | 0.023 | 0.035 | 0.070 | 0.120 | 0.70 | 0.030 | 0.06 |
| 15 | 0.35 | 0.003 | 0.30 | 0.80 | 0.033 | 0.020 | 0.065 | 0.250 | 0.65 | 0.025 | 0.07 |
| 16 | 0.36 | 0.100 | 0.50 | 0.65 | 0.022 | 0.033 | 0.075 | 0.300 | 0.75 | 0.030 | 0.08 |
| 17 | 0.37 | 0.050 | 0.60 | 1.50 | 0.023 | 0.025 | 0.010 | 0.230 | 1.00 | 0.033 | 0.10 |
| 18 | 0.35 | 0.100 | 1.50 | 0.80 | 0.025 | 0.026 | 0.012 | 0.240 | 1.20 | 0.034 | 0.11 |
| 19 | 0.36 | 0.003 | 1.20 | 1.20 | 0.020 | 0.033 | 0.800 | 0.150 | 0.80 | 0.030 | 0.08 |
| 20 | 0.37 | 0.050 | 0.60 | 1.50 | 0.023 | 0.025 | 0.010 | 0.230 | 1.00 | 0.033 | 0.12 |
| 21 | 0.35 | 0.003 | 1.50 | 0.80 | 0.025 | 0.026 | 0.120 | 0.240 | 1.20 | 0.034 | 0.10 |
| 22 | 0.36 | 0.003 | 1.20 | 1.20 | 0.020 | 0.033 | 0.080 | 0.150 | 0.80 | 0.030 | 0.80 |

| Steel sheet no. | Steel composition (mass %) | | | | | | | | | |
|---|---|---|---|---|---|---|---|---|---|---|
| | Ni | Ti | Nb | V | Zr | B | Ca | Rem | Mg | O | Al |
| 1 | — | — | — | — | — | — | — | — | — | — | — |
| 2 | — | — | — | — | — | — | — | — | — | — | — |
| 3 | — | — | — | — | — | — | — | — | — | — | — |
| 4 | — | — | — | — | — | — | — | — | — | — | — |
| 5 | — | — | — | — | — | — | — | — | — | — | — |
| 6 | — | — | — | — | — | — | — | — | — | — | — |
| 7 | — | — | — | — | — | — | — | — | — | — | — |
| 8 | — | — | — | — | — | — | — | — | — | — | — |
| 9 | — | — | — | — | — | — | — | — | — | — | — |
| 10 | — | — | — | — | — | — | — | — | — | — | — |
| 11 | — | — | — | — | — | — | — | — | — | — | — |
| 12 | 0.30 | — | — | — | — | — | — | — | — | — | — |

TABLE 1-continued

| 13 | 0.20 | 0.060 | — | — | — | — | — | — | — | — | — |
|---|---|---|---|---|---|---|---|---|---|---|---|
| 14 | 0.30 | 0.100 | 0.070 | — | — | — | — | — | — | — | — |
| 15 | 0.25 | 0.075 | 0.045 | 0.030 | — | — | — | — | — | — | — |
| 16 | 0.30 | 0.060 | 0.050 | 0.035 | 0.015 | — | — | — | — | — | — |
| 17 | 0.33 | 0.050 | 0.055 | 0.030 | 0.020 | 0.002 | — | — | — | — | — |
| 18 | 0.34 | 0.065 | 0.063 | 0.025 | 0.035 | 0.002 | 0.050 | — | — | — | — |
| 19 | 0.30 | 0.075 | 0.050 | 0.150 | 0.020 | 0.003 | 0.050 | 0.01 | — | — | — |
| 20 | 0.33 | 0.050 | 0.055 | 0.030 | 0.020 | 0.012 | 0.003 | 0.05 | 0.01 | — | — |
| 21 | 0.34 | 0.065 | 0.063 | 0.025 | 0.035 | 0.002 | 0.003 | 0.05 | 0.01 | 0.05 | — |
| 22 | 0.30 | 0.075 | 0.050 | 0.150 | 0.020 | 0.003 | 0.050 | 0.01 | 0.01 | 0.03 | 0.01 |

Next, the enamelware of the examples and comparative examples fabricated by the above method were evaluated for hydrochloric acid resistance, sulfuric acid resistance, enameling characteristics (fishscale resistance and bondability), workability, aging, and producibility (yield).

The sulfuric acid resistance was evaluated by the time (endurance time) until a test piece was corroded to a predetermined thickness by $H_2SO_4$ produced by burning sulfur (S) contained in heavy oil to form $SO_3$ and dissolving this $SO_3$ in water. Specifically, each test piece was mounted at an element of an actual plant of a heavy oil-fired power station installed 200 km inland from the seashore and the time until the thickness was reduced to 60% that of before the test was measured. Note that the sulfur content in the heavy oil used in this plant was 2.5 mass %. Further, the hydrochloric acid resistance was evaluated by the time (endurance time) until a test piece was corroded to a predetermined thickness by the HCl produced by dissolution of the chlorine (Cl) introduced from the outside air in water. Specifically, each test piece was mounted at an element of an air preheater (temperature of 80° C. at time of operation) of an actual plant of a heavy oil-fired power station installed at the seashore and the time until the thickness was reduced to 60% that of before the test was measured. Note that the Cl content at the time of introduction of the outside air in this plant was 20 to 30 ppm.

The fishscale resistance was visually judged by the state of occurrence of fishscale after holding the enamelware in a constant temperature tank of 160° C. As a result, test pieces with no occurrence of fishscale were judged as "Very Good", ones with slight occurrence of fishscale, but of an extent not posing a problem in function or appearance as "Good", ones with occurrence of fishscale of an extent not posing a problem in function, but posing a problem in appearance as "Fair", and ones with occurrence of fishscale of an extent posing a problem in function as "Poor".

The bondability was evaluated by the area rate of not yet peeled parts when dropping a spherical head weight of 2 kg from a height of 1 m and measuring the state of peeling of the enamel layer at the deformed part by 169 contact probes since there was no difference with the usually performed PEI bonding test method (ASTM C313-59). As a result, test pieces with an area rate of unpeeled parts of 80% or more were judged as "Very Good", ones with 60% to less than 80% as "Good", ones with 40% to less than 60% as "Fair", and ones with less than 40% as "Poor".

The workability was evaluated by the elongation El and r-value when fabricating JIS No. 5 test pieces from the enamelware and running tensile tests. As a result, test pieces with an elongation El of 48% or more and an r-value of 1.8 or more were judged as "Very Good", ones with an elongation El of 45% to less than 48% and an r-value of 1.6 to less than 1.8 as "Good", ones with an elongation El of 43% to less than 45% and an r-value of 1.3 to less than 1.6 as "Fair", and ones with an elongation El of less than 43% and an r-value of less than 1.3% as "Poor".

The aging resistance were evaluated by the aging index AI found by the difference in stress before and after pre-stressing by 10% by tension, then holding at 100° C. for 60 hours. As a result, test pieces with an aging index AI of 10 MPa or less were judged as "Very Good", ones with over 10 MPa to 20 MPa as "Good", ones with over 20 MPa to 30 MPa as "Fair", and ones with over 30 MPa as "Poor".

The producibility (yield) was evaluated by the state of occurrence of peeling and slivers. Specifically, test pieces with peeling or slivers occurring at the time of production of the steel substrates were judged as "defective products", ones with a yield of 98% or more as "Very Good", ones with 96% to less than 98% as "Good", ones with 92% to less than 96% as "Fair", and ones with less than 92% as "Poor". The above results of evaluation are shown together in the following Table 2 and Table 3. Note that the following Table 2 and Table 3 show also the Co content and Ni content in the enamel layer. Further, in the following Table 2 and Table 3, conditions outside the range of the present invention are shown underlined

TABLE 2

| | | | Content in enamel layer (mass %) | | Results of evaluation | | | | | | |
|---|---|---|---|---|---|---|---|---|---|---|---|
| | | | | | Endurance time (years) | | Enameling characteristics | | | | |
| Class | No. | Steel sheet no. | Co | Ni | Resistance to sulfuric acid | Resistance to hydrochloric acid | Fishscale resistance | Bondability | Workability | Aging | Producibility (yield) |
| Example | 1 | 1 | 0.15 | 0.5 | 6.2 | 6.3 | Good | Fair | Good | Good | Good |
| | 2 | 2 | 0.15 | 0.5 | 6.6 | 6.7 | Good | Fair | Good | Good | Good |
| | 3 | 3 | 0.15 | 0.5 | 6.8 | 6.8 | Good | Fair | Good | Good | Good |
| | 4 | 4 | 0.15 | 0.5 | 6.2 | 6.3 | Good | Fair | Good | Good | Good |
| | 5 | 5 | 0.15 | 0.5 | 6.8 | 6.8 | Good | Fair | Good | Good | Good |
| | 6 | 6 | 0.15 | 0.5 | 6.2 | 6.3 | Good | Fair | Good | Good | Good |
| | 7 | 7 | 0.15 | 0.5 | 6.8 | 6.8 | Good | Fair | Good | Good | Good |
| | 8 | 8 | 0.15 | 0.5 | 6.6 | 6.7 | Good | Fair | Good | Good | Good |
| | 9 | 9 | 0.15 | 0.5 | 6.2 | 6.3 | Good | Fair | Good | Good | Good |

TABLE 2-continued

| | | | Content in enamel layer (mass %) | | Results of evaluation | | | | | | |
|---|---|---|---|---|---|---|---|---|---|---|---|
| | | | | | Endurance time (years) | | Enameling characteristics | | | | |
| | | Steel sheet | | | Resistance to | Resistance to | Fishscale | | | | Producibility |
| Class | No. | no. | Co | Ni | sulfuric acid | hydrochloric acid | resistance | Bondability | Workability | Aging | (yield) |
| | 10 | 10 | 0.15 | 0.5 | 6.6 | 6.7 | Good | Good | Good | Good | Good |
| | 11 | 11 | 0.15 | 0.5 | 6.8 | 6.8 | Good | Good | Good | Good | Good |
| | 12 | 12 | 0.15 | 0.5 | 6.6 | 6.7 | Good | Good | Good | Good | Good |
| | 13 | 13 | 0.15 | 0.5 | 6.2 | 6.3 | Good | Good | Very Good | Very Good | Good |
| | 14 | 14 | 0.15 | 0.5 | 6.6 | 6.7 | Good | Good | Very Good | Very Good | Good |
| | 15 | 15 | 0.15 | 0.5 | 6.8 | 6.8 | Good | Good | Very Good | Very Good | Good |
| | 16 | 16 | 0.15 | 0.5 | 6.2 | 6.5 | Good | Good | Very Good | Very Good | Good |
| | 17 | 17 | 0.15 | 0.5 | 6.6 | 6.7 | Good | Good | Very Good | Very Good | Good |
| | 18 | 18 | 0.15 | 0.5 | 6.2 | 6.5 | Good | Good | Very Good | Very Good | Very Good |
| | 19 | 19 | 0.15 | 0.5 | 6.6 | 6.7 | Good | Good | Very Good | Very Good | Very Good |
| | 20 | 20 | 0.15 | 0.5 | 6.2 | 6.7 | Good | Good | Very Good | Very Good | Very Good |
| | 21 | 21 | 0.15 | 0.5 | 6.5 | 6.5 | Very Good | Good | Very Good | Very Good | Very Good |
| | 22 | 22 | 0.15 | 0.5 | 6.7 | 6.7 | Very Good | Good | Very Good | Very Good | Very Good |
| | 23 | 22 | — | 0.5 | 6.3 | 6.3 | Very Good | Very Good | Very Good | Very Good | Very Good |
| | 24 | 22 | — | 1.1 | 6.6 | 6.6 | Very Good | Very Good | Very Good | Very Good | Very Good |
| | 25 | 22 | — | 3.2 | 6.7 | 6.7 | Very Good | Very Good | Very Good | Very Good | Very Good |
| | 26 | 22 | — | 3.8 | 6.8 | 6.8 | Very Good | Very Good | Very Good | Very Good | Very Good |
| | 27 | 22 | — | 6.5 | 6.5 | 6.5 | Very Good | Very Good | Very Good | Very Good | Very Good |
| | 28 | 22 | — | 8.5 | 6.3 | 6.3 | Very Good | Very Good | Very Good | Very Good | Very Good |
| | 29 | 22 | — | 9.8 | 6.5 | 6.5 | Very Good | Very Good | Very Good | Very Good | Very Good |
| | 30 | 22 | — | 15.2 | 6.6 | 6.6 | Very Good | Very Good | Very Good | Very Good | Very Good |
| | 31 | 22 | — | 18.1 | 6.7 | 6.7 | Very Good | Very Good | Very Good | Very Good | Very Good |

TABLE 3

| | | | Content in enamel layer (mass %) | | Results of evaluation | | | | | | |
|---|---|---|---|---|---|---|---|---|---|---|---|
| | | | | | Endurance time (years) | | Enameling characteristics | | | | |
| | | Steel sheet | | | Resistance to | Resistance to | Fishscale | | | | Producibility |
| Class | No. | no. | Co | Ni | sulfuric acid | hydrochloric acid | resistance | Bondability | Workability | Aging | (yield) |
| Example | 32 | 22 | 0.1 | — | 6.6 | 6.5 | Very Good | Very Good | Very Good | Very Good | Very Good |
| | 33 | 22 | 0.5 | — | 6.6 | 6.6 | Very Good | Very Good | Very Good | Very Good | Very Good |
| | 34 | 22 | 1.6 | — | 6.8 | 6.7 | Very Good | Very Good | Very Good | Very Good | Very Good |
| | 35 | 22 | 3.2 | — | 6.8 | 6.8 | Very Good | Very Good | Very Good | Very Good | Very Good |
| | 36 | 22 | 5.5 | — | 6.7 | 6.6 | Very Good | Very Good | Very Good | Very Good | Very Good |
| | 37 | 22 | 7.5 | — | 6.3 | 6.3 | Very Good | Very Good | Very Good | Very Good | Very Good |
| | 38 | 22 | 8.8 | — | 6.7 | 6.6 | Very Good | Very Good | Very Good | Very Good | Very Good |
| | 39 | 22 | 9.8 | — | 6.6 | 6.6 | Very Good | Very Good | Very Good | Very Good | Very Good |
| | 40 | 22 | 0.5 | 0.6 | 6.8 | 6.7 | Very Good | Very Good | Very Good | Very Good | Very Good |
| | 41 | 22 | 1.5 | 1.3 | 6.8 | 6.8 | Very Good | Very Good | Very Good | Very Good | Very Good |
| | 42 | 22 | 2.2 | 2.8 | 6.6 | 6.8 | Very Good | Very Good | Very Good | Very Good | Very Good |
| | 43 | 22 | 3.5 | 3.8 | 6.3 | 6.6 | Very Good | Very Good | Very Good | Very Good | Very Good |
| | 44 | 22 | 6.2 | 5.0 | 6.8 | 6.6 | Very Good | Very Good | Very Good | Very Good | Very Good |
| | 45 | 22 | 8.0 | 5.1 | 6.6 | 6.8 | Very Good | Very Good | Very Good | Very Good | Very Good |
| | 46 | 22 | 9.3 | 5.3 | 6.7 | 6.8 | Very Good | Very Good | Very Good | Very Good | Very Good |
| | 47 | 1 | 0.005 | 0.03 | 6.2 | 6.5 | Good | Poor | Good | Good | Good |
| | 48 | 2 | 0.005 | 0.03 | 6.6 | 6.7 | Good | Poor | Good | Good | Good |
| | 49 | 3 | 0.005 | 0.03 | 6.8 | 6.8 | Good | Poor | Good | Good | Good |
| | 50 | 4 | 0.005 | 0.03 | 6.2 | 6.5 | Good | Poor | Good | Good | Good |
| | 51 | 5 | 0.005 | 0.03 | 6.8 | 6.8 | Good | Poor | Good | Good | Good |
| | 52 | 6 | 0.005 | 0.03 | 6.2 | 6.5 | Good | Poor | Good | Good | Good |
| | 53 | 7 | 0.005 | 0.03 | 6.8 | 6.8 | Good | Poor | Good | Good | Good |
| | 54 | 8 | 0.005 | 0.03 | 6.6 | 6.7 | Good | Poor | Good | Good | Good |
| | 55 | 9 | 0.005 | 0.03 | 6.2 | 6.5 | Good | Poor | Good | Good | Good |
| | 56 | 10 | 0.005 | 0.03 | 6.6 | 6.7 | Good | Poor | Good | Good | Good |
| | 57 | 11 | 0.005 | 0.03 | 6.8 | 6.8 | Good | Poor | Good | Good | Good |
| | 58 | 22 | — | 0.03 | 1.7 | 1.3 | Good | Poor | Good | Good | Good |
| | 59 | 22 | — | 22 | 1.8 | 1.7 | Good | Good | Good | Good | Good |
| | 60 | 22 | 0.005 | — | 1.5 | 1.6 | Good | Poor | Good | Good | Good |
| | 61 | 22 | 11 | — | 1.7 | 1.8 | Good | Good | Good | Good | Good |
| | 62 | 22 | 12 | 5.0 | 1.6 | 1.8 | Good | Good | Good | Good | Good |
| | 63 | 22 | 6.2 | 21 | 1.6 | 1.5 | Good | Good | Good | Good | Good |
| | 64 | 22 | 11 | 22 | 1.7 | 1.6 | Good | Good | Good | Good | Good |

As shown in the above Table 2 and Table 3, the enamelware of Example No. 1 to No. 46 in the range of the present invention are superior in each of the items of sulfuric acid resistance, hydrochloric acid resistance, enameling characteristics, workability, aging, and producibility. In particular, the enamelware of Example No. 13 to No. 46 comprised of the steel substrates to which Ti, Nb, V, and/or Zr has been added in the range of the present invention were superior in workability and aging resistance. Further, the enamelware of No. 18 to No. 46 comprised of the steel substrates to which Ca, Rem, and/or Mg has been added in the range of the present invention were high in yield and superior in producibility. Further, the enamelware of Example No. 21 to No. 46 comprised of the steel substrates to which Al and/or O has been added in the range of the present invention did not suffer from fishscale and were superior in fishscale resistance.

On the other hand, the enamelware of Comparative Example No. 47 to No. 58 and No. 60 with compositions of the steel substrates in the range of the present invention, but with Co contents and Ni contents of the enamel layers less than the range of the present invention were all inferior in bondability. Further, the enamelware of Comparative Example No. 59 and No. 61 to No. 64 with Co contents and Ni contents of the enamel layers exceeding the range of the present invention had a bondability equal to that of the enamelware of the above examples, but the production costs became higher and the practical usefulness was therefore poor.

Example 2

Next, as Example 2 of the present invention, the same method as in the above-mentioned Example 1 was used to prepare steel sheets of the compositions shown in the following Table 4. These steel sheets were used as the steel substrates to prepare enamelware of the examples and comparative examples. At that time, the Co content in the enamel layer was made 0.15%, and the Ni content was made 0.50%. Further, the enamelware of the examples and comparative examples were evaluated for enameling characteristics by methods similar to the above-mentioned Example 1. The results are shown in the following Table 5. Note that the balance of the steel composition shown in following Table 4 was comprised of Fe and unavoidable impurities. Further, in the following Table 4, conditions outside of the range of the present invention are shown underlined

TABLE 4

| Steel sheet no. | Steel composition (mass %) | | | | | | | | | | |
|---|---|---|---|---|---|---|---|---|---|---|---|
| | Cu | C | Si | Mn | P | S | Sb | Sn | Cr | Mo | Co |
| 6 | 0.35 | 0.003 | 0.25 | 0.88 | 0.025 | 0.018 | — | — | — | — | — |
| 7 | 0.36 | 0.100 | 0.80 | 1.00 | 0.020 | 0.050 | 0.075 | — | — | — | — |
| 8 | 0.37 | 0.070 | 0.50 | 0.87 | 0.018 | 0.025 | 0.80 | 0.065 | — | — | — |
| 9 | 0.33 | 0.003 | 0.75 | 0.65 | 0.026 | 0.035 | 0.010 | 0.150 | 1.00 | — | — |
| 21 | 0.35 | 0.003 | 1.50 | 0.80 | 0.025 | 0.026 | 0.120 | 0.240 | 1.20 | 0.034 | 0.10 |
| 22 | 0.36 | 0.003 | 1.20 | 1.20 | 0.020 | 0.033 | 0.080 | 0.150 | 0.80 | 0.30 | 0.80 |
| 23 | 0.33 | 0.003 | <u>0.03</u> | <u>0.03</u> | 0.026 | 0.035 | <u>1.000</u> | — | — | — | — |
| 24 | 0.35 | 0.005 | 0.25 | 0.88 | 0.025 | <u>0.003</u> | 0.018 | — | — | — | — |
| 25 | 0.36 | 0.003 | 1.20 | 1.20 | 0.020 | 0.033 | 0.800 | 0.300 | 0.80 | 0.300 | 0.80 |

| Steel sheet no. | Steel composition (mass %) | | | | | | | | | |
|---|---|---|---|---|---|---|---|---|---|---|
| | Ni | Ti | Nb | V | Zr | B | Ca | Rem | Mg | O | Al |
| 6 | — | — | — | — | — | — | — | — | — | — | — |
| 7 | — | — | — | — | — | — | — | — | — | — | — |
| 8 | — | — | — | — | — | — | — | — | — | — | — |
| 9 | — | — | — | — | — | — | — | — | — | — | — |
| 21 | 0.34 | 0.065 | 0.063 | 0.025 | 0.035 | 0.002 | 0.007 | 0.05 | 0.01 | 0.05 | — |
| 22 | 0.30 | 0.075 | 0.050 | 0.150 | 0.020 | 0.003 | 0.050 | 0.01 | 0.01 | 0.03 | 0.01 |
| 23 | — | — | — | — | — | — | — | — | — | — | — |
| 24 | — | — | — | — | — | — | — | — | — | — | — |
| 25 | 0.30 | 0.075 | 0.050 | 0.150 | 0.020 | 0.003 | 0.050 | 0.01 | 1.00 | 0.03 | <u>0.15</u> |

TABLE 5

| Class | No. | Steel sheet no. | Enameling characteristics | |
|---|---|---|---|---|
| | | | Fishscale resistance | Bondability |
| Examples | 6 | 6 | Good | Fair |
| | 7 | 7 | Good | Fair |
| | 8 | 8 | Good | Fair |
| | 9 | 9 | Good | Fair |
| | 21 | 21 | Very good | Good |
| | 22 | 22 | Very good | Good |
| Comparative example | 65 | 23 | Poor | Poor |
| | 66 | 24 | Poor | Poor |
| | 67 | 25 | Poor | Poor |

As shown in Table 4 and Table 5, enamelware of Comparative Example No. 65 comprised of a steel substrate with contents of Si, Mn, and Sb outside the range of the present invention, enamelware of Comparative Example No. 66 comprised of a steel substrate with an S content outside the range of the present invention, and enamelware of Comparative Example No. 67 comprised of a steel substrate with an Al content exceeding the range of the present invention were inferior in fishscale resistance and bondability compared with the enamelware of Example No. 6 to No. 9, No. 21, and No. 22.

Example 3

Next, as Example 3 of the present invention, enamelware provided with Ni plating layers between the steel substrates and enamel layers were fabricated and evaluated for effects of the plating layers. Specifically, the steels of No. 20 to No. 22 shown in Table 1 were made in a vacuum melting furnace, cast into ingots, then hot rolled, cold rolled, and annealed to fabricate steel sheets (steel substrates) having a thickness of 1.0 mm. After this, the surfaces of the steel sheets were plated with Ni on their two surfaces to thicknesses of 100 μm, then these Ni plating layers were formed with enamel layers of thicknesses of 150 μm to thereby prepare the enamelware of Example No. 68 to No. 70. At that time, the Co content in the enamel layer was 0.15%, while the Ni content was 0.50%. Further, steel substrates of compositions the same as the enamelware of Example No. 68 to No. 70 were used to form enamel layers on the surfaces of steel substrates under the same conditions as Example No. 68 to No. 70 except for not providing Ni plating layers so as to prepare enamelware of Comparative Example No. 71 to No. 73. Further, the enamelware prepared by the above method were evaluated for bondability by the same method as in the above-mentioned Example 1. The results are shown in the following Table 6.

TABLE 6

| Class | No. | Steel sheet no. | Ni plating | Bondability |
|---|---|---|---|---|
| Examples | 68 | 20 | Yes | Very good |
| | 69 | 21 | Yes | Very good |
| | 70 | 22 | Yes | Very good |
| Comparative examples | 71 | 20 | No | Good |
| | 72 | 21 | No | Good |
| | 73 | 22 | No | Good |

As shown in Table 6, the enamelware of Example No. 68 to No. 70 with Ni plating layers provided between the steel substrates and enamel layers were superior in bondability compared with the enamelware of Comparative Example No. 71 to No. 73 with no Ni plating layers. Note that the bondability between the steel substrate and enamel layer had an effect on the endurance time mainly when damage occurred at the time of installation, but in the present case, the test pieces were installed so as to prevent damage, no difference could be seen in the endurance time between the enamelware of Example No. 68 to No. 70 and the enamelware of Comparative Example No. 71 to No. 73.

Example 4

Next, as Example 4 of the present invention, steels of the compositions shown in Table 1 were made in a vacuum melting furnace, cast into ingots, then hot rolled, cold rolled, and annealed to produce steel sheets (steel substrates) with a thickness of 1.0 mm. Their surfaces were formed with enamel layers of thicknesses of 150 μm using enamel glazes different in Co oxide and/or Ni oxide content to thereby fabricate enamelware of Example No. 74 to No. 90 and Comparative Example No. 96 to No. 99. Next, the enamelware of the examples and comparative examples fabricated by the above method were evaluated by the same method as in the above-mentioned Example 1 for sulfuric acid resistance, hydrochloric acid resistance, enameling characteristics (fishscale resistance and bondability), workability, aging resistance, and producibility (yield). Further, the steel sheets not formed with enamel layers were similarly evaluated as Comparative Example No. 91 to No. 95. The above results are shown together in the following Table 7. Note that the following Table 7 also shows the content of Co oxides in the glaze (converted to Co) and content of Ni oxides (converted to Ni) and the total amount of Co and total amount of Ni with respect to the total mass of the enamelware.

TABLE 7

| Class | No. | Steel sheet no. | Content in glaze (mass %) Co oxide | Content in glaze (mass %) Ni oxide | Content per total mass of enamelware (mass %) Total Co amount | Content per total mass of enamelware (mass %) Total Ni amount | Results of evaluation Endurance time (years) Resistance to sulfuric acid | Results of evaluation Endurance time (years) Resistance to hydrochloric acid |
|---|---|---|---|---|---|---|---|---|
| Example | 74 | 12 | 0.005 | 0.003 | 0.0575 | 0.2877 | 6.6 | 6.7 |
| | 75 | 13 | 0.005 | 0.003 | 0.0480 | 0.1923 | 6.2 | 6.3 |
| | 76 | 14 | 0.005 | 0.003 | 0.0575 | 0.2877 | 6.6 | 6.7 |
| | 77 | 15 | 0.005 | 0.003 | 0.0623 | 0.2400 | 6.8 | 6.8 |
| | 78 | 16 | 0.005 | 0.003 | 0.0718 | 0.2877 | 6.2 | 6.3 |
| | 79 | 17 | 0.005 | 0.003 | 0.0957 | 0.3163 | 6.6 | 6.7 |
| | 80 | 18 | 0.005 | 0.003 | 0.1052 | 0.3259 | 6.2 | 6.3 |
| | 81 | 19 | 0.005 | 0.003 | 0.0766 | 0.2877 | 6.6 | 6.7 |
| | 82 | 20 | 0.005 | 0.003 | 0.1148 | 0.3163 | 6.6 | 6.7 |
| | 83 | 22 | 0.005 | 0.003 | 0.0957 | 0.3259 | 6.2 | 6.3 |
| | 84 | 21 | 0.005 | 0.003 | 0.7638 | 0.2877 | 6.6 | 6.7 |
| | 85 | 22 | 1.398 | 1.219 | 0.5000 | 0.500 | 6.6 | 6.7 |
| | 86 | 22 | 3.072 | 4.195 | 1.5000 | 1.5000 | 6.2 | 6.3 |
| | 87 | 22 | 6.642 | 6.791 | 2.6000 | 2.3000 | 6.6 | 6.7 |
| | 88 | 22 | 8.265 | 9.713 | 3.1000 | 3.2000 | 6.6 | 6.7 |
| | 89 | 10 | — | 10.386 | — | 3.2000 | 6.2 | 6.3 |
| | 90 | 11 | 9.927 | — | 3.1000 | — | 6.6 | 6.7 |
| Comp. ex. | 91 | 1 | — | — | — | — | 1.2 | 1.0 |
| | 92 | 2 | — | — | — | — | 1.6 | 1.4 |
| | 93 | 20 | — | — | — | — | 1.8 | 1.6 |
| | 94 | 21 | — | — | — | — | 1.6 | 1.4 |
| | 95 | 22 | — | — | — | — | 1.6 | 1.4 |
| | 96 | 22 | 11.835 | 13.283 | 4.2000 | 4.3000 | 6.6 | 6.3 |
| | 97 | 22 | 8.265 | 14.257 | 3.1000 | 4.6000 | 6.6 | 6.7 |
| | 98 | 10 | — | 14.930 | — | 4.6000 | 6.2 | 6.3 |
| | 99 | 11 | 13.497 | — | 4.2000 | — | 6.6 | 6.7 |

TABLE 7-continued

| | | Steel | Results of evaluation | | | | |
|---|---|---|---|---|---|---|---|
| | | | Enameling characteristics | | | | |
| Class | No. | sheet no. | Fishscale resistance | Bondability | Workability | Aging | Producibility (yield) |
| Example | 74 | 12 | Very Good | Very Good | Very Good | Very Good | Very Good |
| | 75 | 13 | Very Good | Very Good | Very Good | Very Good | Very Good |
| | 76 | 14 | Very Good | Very Good | Very Good | Very Good | Very Good |
| | 77 | 15 | Very Good | Very Good | Very Good | Very Good | Very Good |
| | 78 | 16 | Very Good | Very Good | Very Good | Very Good | Very Good |
| | 79 | 17 | Very Good | Very Good | Very Good | Very Good | Very Good |
| | 80 | 18 | Very Good | Very Good | Very Good | Very Good | Very Good |
| | 81 | 19 | Very Good | Very Good | Very Good | Very Good | Very Good |
| | 82 | 20 | Very Good | Very Good | Very Good | Very Good | Very Good |
| | 83 | 22 | Very Good | Very Good | Very Good | Very Good | Very Good |
| | 84 | 21 | Very Good | Very Good | Very Good | Very Good | Very Good |
| | 85 | 22 | Very Good | Very Good | Very Good | Very Good | Very Good |
| | 86 | 22 | Very Good | Very Good | Very Good | Very Good | Very Good |
| | 87 | 22 | Very Good | Very Good | Very Good | Very Good | Very Good |
| | 88 | 22 | Very Good | Very Good | Very Good | Very Good | Very Good |
| | 89 | 10 | Very Good | Very Good | Very Good | Very Good | Very Good |
| | 90 | 11 | Very Good | Very Good | Very Good | Very Good | Very Good |
| Comp. ex. | 91 | 1 | Very Good | Poor | Very Good | Very Good | Very Good |
| | 92 | 2 | Very Good | Poor | Very Good | Very Good | Very Good |
| | 93 | 20 | Very Good | Poor | Very Good | Very Good | Very Good |
| | 94 | 21 | Very Good | Poor | Very Good | Very Good | Very Good |
| | 95 | 22 | Very Good | Poor | Very Good | Very Good | Very Good |
| | 96 | 22 | Very Good | Very Good | Very Good | Very Good | Very Good |
| | 97 | 22 | Very Good | Very Good | Very Good | Very Good | Very Good |
| | 98 | 10 | Very Good | Very Good | Very Good | Very Good | Very Good |
| | 99 | 11 | Very Good | Very Good | Very Good | Very Good | Very Good |

As shown in Table 7, the steel sheets of Comparative Example No. 91 to No. 95 not formed with enamel layers were superior in workability, aging resistance, and producibility, but the endurance time was about 1.5th that of the enamelware of Example No. 74 to No. 90. Due to this, the enamelware of Example No. 74 to No. 90 with a total content of Ni and a total content of Co contained in the steel substrate and enamel layer of within the range of the present invention could be confirmed to be greatly improved in sulfuric acid resistance and hydrochloric acid resistance compared with steel sheets not provided with enamel layers. Further, the enamelware of Comparative Example No. 96 to No. 99 with total Co and/or total Ni amounts in the steel substrate and enamel layer over the ranges of the present invention gave enameling characteristics equal to those of the enamelware of Example No. 74 to No. 90, but the production costs were higher and the practical applicabilities were inferior.

Example 5

Next, as Example 5 of the present invention, to confirm the effects of the bondability between the steel substrate and enamel layer on the durability (sulfuric acid resistance and hydrochloric acid resistance), tests were conducted to inflict similar damage by shot blasting as with wear due to particles in exhaust gas received during actual use. Specifically, steels of the compositions of the following Table 8 were made in a vacuum melting furnace, cast into ingots, then hot rolled, cold rolled, and annealed to produce steel sheets (steel substrates) with thicknesses of 1.0 mm. Their surfaces were formed with enamel layers of thicknesses of 150 μm to prepare enamelware of Example No. 100 to No. 102 and Comparative Example No. 103 to No. 105. At that time, the Co contents in the enamel layers were made 0.15%, and the Ni contents were made 0.50%. Note that the balances of the steel compositions shown in the following Table 8 were comprised of Fe and unavoidable impurities. Further, in the following Table 8, conditions outside of the range of the present invention are shown underlined. Next, the surfaces of the enamelware fabricated by the above method were shot blasted to deliberately reduce the thicknesses of the enamel layers, then were measured for endurance time (hydrochloric acid resistance and sulfuric acid resistance). The results are shown in the following Table 9.

TABLE 8

| Steel sheet no. | Steel composition (mass %) | | | | | | | | | | | | | | | | | | | | | |
|---|---|---|---|---|---|---|---|---|---|---|---|---|---|---|---|---|---|---|---|---|---|---|
| | Cu | C | Si | Mn | P | S | Sb | Sn | Cr | Mo | Co | Ni | Ti | Nb | V | Zr | B | Ca | Rem | Mg | O | Al |
| 26 | 0.33 | 0.003 | 0.75 | 0.65 | 0.026 | 0.035 | — | — | 1.00 | — | — | — | — | — | — | — | — | — | — | — | — | — |
| 27 | 0.37 | 0.070 | 0.50 | 0.87 | 0.018 | 0.025 | 0.080 | — | 1.00 | — | — | — | — | — | — | — | — | — | — | — | — | — |
| 28 | 0.35 | 0.005 | 0.25 | 0.88 | 0.025 | 0.003 | 0.080 | 0.070 | 1.00 | — | — | — | — | — | — | — | — | — | — | — | — | — |
| 29 | 0.33 | 0.003 | 0.03 | 0.03 | 0.026 | 0.035 | — | — | 0.003 | — | — | — | — | — | — | — | — | — | — | — | — | — |
| 30 | 0.33 | 0.003 | 0.75 | 0.65 | 0.026 | 0.035 | 0.002 | — | 0.003 | — | — | — | — | — | — | — | — | — | — | — | — | — |
| 31 | 0.35 | 0.100 | 1.50 | 0.80 | 0.025 | 0.026 | 0.002 | 0.003 | 0.003 | — | — | — | — | — | — | — | — | — | — | — | — | — |

TABLE 9

| Class | No. | Steel sheet no. | Endurance time (years) | |
| | | | Resistance to sulfuric acid | Resistance to hydrochloric acid |
| --- | --- | --- | --- | --- |
| Examples | 100 | 26 | 5.1 | 5.2 |
| | 101 | 27 | 5.3 | 5.6 |
| | 102 | 28 | 5.8 | 5.8 |
| Comparative examples | 103 | 9 | 1.6 | 1.7 |
| | 104 | 30 | 1.5 | 1.8 |
| | 105 | 31 | 1.5 | 1.6 |

As shown in the Table 9, in shot blasted enamelware, the enamelware of Example No. 100 to No. 102 improved in bondability by addition of predetermined amounts of Cr, Sb, or Sn were greatly improved in resistance to hydrochloric acid and resistance to sulfuric acid compared with the enamelware of Comparative Example No. 103 to No. 105 in which the amounts of addition of these elements were less than the range of the present invention.

INDUSTRIAL APPLICABILITY

According to the present invention, since the Co C content and/or Ni content in the enamel layer or glaze are suitably set, the bondability between the steel substrate and enamel layer can be improved. Further, since the composition of the steel substrate is suitably set, the corrosion resistance of the substrate itself can be improved. As a result, compared with the conventional products, enamelware superior in resistance to corrosion by sulfuric acid and resistance to corrosion by hydrochloric acid can be obtained.

The invention claimed is:

1. Enamelware comprised of a steel substrate on the surface of which an enamel layer is provided, wherein said steel substrate contains, by mass %,
Cu: 0.05 to 0.37%,
Si: 0.1 to 2.0%,
Mn: 1.2 to 2.0%,
Mo: 0.003 to 0.034
P: 0.005 to 0.10%,
S: 0.005 to 0.1%,
C: 0.20% or less,
Sb: 0.080 to 0.8%,
Ni: 0.005 to 4.5%, and
Co: 0.008 to 4.0%;
optionally one or more elements selected from the group consisting of:
Sn: 0.005 to 0.3%,
Cr: 0.005 to 2.0%
Ti: 0.01 to 2.0%,
Nb: 0.01 to 2.0%,
V: 0.01 to 2.0%,
Zr: 0.01 to 2.0%,
B: 0.001 to 1.0%
Ca: 0.005 to 2.0%,
Rem: 0.005 to 2.0%,
Mg: 0.005 to 1.0%,
O: 0.01 to 0.30%,
Al: 0.005 to 0.10% and
a balance of Fe and unavoidable impurities,
wherein said enamel layer has a thickness of 50 to 700 μm, and contains at least one element selected from the group consisting of, in total content per total mass, Ni: 0.005 to 4.5% and Co: 0.008 to 4.0%.

2. Enamelware as set forth in claim 1, characterized in that said steel substrate and said enamel layer have a plating layer comprised of Ni, an Ni alloy, Co, a Co alloy, Zn, a Zn alloy, Al, an Al alloy, Sn, or a Sn alloy having a thickness of 1 to 500 μm provided between them.

3. Enamelware as set forth in claim 1, characterized in that said steel substrate contains, by mass %, Ni: 0.30 to 4.5%.

4. A method of producing an enamelware superior in resistance to dew point corrosion by sulfuric acid and hydrochloric acid comprising:
forming a steel substrate as set forth in claim 1 onto a surface of which an enamel layer is provided, wherein said enamel layer has a thickness of 50 to 700 μm, and contains at least one element selected from the group consisting of, in total content per total mass, Ni: 0.005 to 4.5% and Co: 0.008 to 4.0%.

* * * * *

UNITED STATES PATENT AND TRADEMARK OFFICE
CERTIFICATE OF CORRECTION

PATENT NO. : 8,758,893 B2  
APPLICATION NO. : 12/087801  
DATED : June 24, 2014  
INVENTOR(S) : Satoshi Nishimura et al.

Page 1 of 1

It is certified that error appears in the above-identified patent and that said Letters Patent is hereby corrected as shown below:

In the Specification

Column 2, line 36, change "restricts C to C, 0.20% or less," to -- restricts C to C: 0.20% or less, --;

Column 2, line 56, change "restricts C to C, 0.20% or less," to -- restricts C to C: 0.20% or less, --;

Column 4, line 5, change "restricting the C to C, 0.20% or less," to -- restricting C to C: 0.20% or less, --;

Column 7, line 20, change "if the 0 content" to -- if the O content --;

Column 21, line 24, change "since the Co C content" to -- since the Co content --.

Signed and Sealed this  
Tenth Day of February, 2015

Michelle K. Lee  
*Deputy Director of the United States Patent and Trademark Office*